(12) United States Patent
Zuniga et al.

(10) Patent No.: US 8,391,236 B2
(45) Date of Patent: Mar. 5, 2013

(54) HETEROGENEOUS NETWORK HANDOVER-SUPPORT MECHANISM

(75) Inventors: Juan Carlos Zuniga, Montreal (CA); Diana Pani, Montreal (CA); Ulises Olvera-Hernandez, Kirkland (CA)

(73) Assignee: Interdigital Technology Corporation, Wilmington, DE (US)

( * ) Notice: Subject to any disclaimer, the term of this patent is extended or adjusted under 35 U.S.C. 154(b) by 706 days.

(21) Appl. No.: 12/134,329

(22) Filed: Jun. 6, 2008

(65) Prior Publication Data

US 2008/0305799 A1  Dec. 11, 2008

Related U.S. Application Data

(60) Provisional application No. 60/944,696, filed on Jun. 18, 2007, provisional application No. 60/942,364, filed on Jun. 6, 2007.

(51) Int. Cl.
*H04W 36/00* (2009.01)
*H04W 4/00* (2009.01)

(52) U.S. Cl. ........ 370/331; 370/332; 370/333; 370/334; 455/436; 455/437; 455/438; 455/439; 455/440; 455/441; 455/442; 455/443; 455/444

(58) Field of Classification Search .......... 455/436–444; 370/331–334
See application file for complete search history.

(56) References Cited

U.S. PATENT DOCUMENTS

| | | | |
|---|---|---|---|
| 6,725,039 B1 | 4/2004 | Parmar et al. | |
| 6,978,120 B1 * | 12/2005 | Melero | 455/67.11 |
| 7,359,347 B2 | 4/2008 | Ahmavaara et al. | |
| 7,457,623 B2 | 11/2008 | Naghian et al. | |
| 7,483,984 B1 | 1/2009 | Jonker et al. | |
| 7,596,118 B2 * | 9/2009 | Kim et al. | 370/330 |
| 7,710,923 B2 * | 5/2010 | Carlton | 370/331 |
| 7,710,924 B2 * | 5/2010 | Kim et al. | 370/331 |
| 7,792,081 B2 * | 9/2010 | Kim et al. | 370/331 |
| 7,813,319 B2 * | 10/2010 | Dutta et al. | 370/331 |
| 7,848,291 B2 * | 12/2010 | Kiernan et al. | 370/331 |
| 7,885,236 B2 * | 2/2011 | Kim et al. | 370/331 |
| 2005/0117595 A1 * | 6/2005 | El-Beik et al. | 370/401 |
| 2006/0092864 A1 * | 5/2006 | Gupta et al. | 370/278 |
| 2006/0099950 A1 * | 5/2006 | Klein et al. | 455/439 |
| 2006/0246904 A1 * | 11/2006 | Olvera-Hernandez et al. | 455/438 |
| 2006/0291423 A1 * | 12/2006 | Carlton | 370/331 |
| 2007/0070949 A1 * | 3/2007 | Hwang et al. | 370/331 |
| 2008/0186892 A1 * | 8/2008 | Damnjanovic | 370/311 |
| 2008/0248780 A1 * | 10/2008 | Oba et al. | 455/411 |

FOREIGN PATENT DOCUMENTS

| | | |
|---|---|---|
| WO | 2006/124514 | 11/2006 |
| WO | 2007/036796 | 4/2007 |

OTHER PUBLICATIONS

IEEE P802.21/D03.33, Draft IEEE Standard for Local and Metropolitan Area Networks: Media Independent Handover Services (Dec. 2006).

LAN MAN Standards Committee of the IEEE Computer Society, "Information Technology—Telecommuncations and Information Exchange Between Systems—Local and Metropolitan Area Networks—Specific Requirements—Part 11: Wireless LAN Medium Access Control (MAC) and Physical Layer (PHY) Specifications", ANSI/IEEE Std 802.11, 1999 Edition (R2003), (Reaffirmed Jun. 12, 2003).

(Continued)

*Primary Examiner* — Nathan Mitchell
(74) *Attorney, Agent, or Firm* — Volpe and Koenig, P.C.

(57) ABSTRACT

Methods and mechanisms enhance heterogeneous media independent handover (MIH) between different link layer technologies. Embodiments include using an MIH proxy entity, MIH capable network controller, and an MIH server. Enhancements are made to the query phase, preparation phase, execution phase and completion phase by including required information in MIH messages.

15 Claims, 8 Drawing Sheets

OTHER PUBLICATIONS

Third Generation Partnership Project, "Technical Specification Group GERAN; Packet-switched handover for GERAN A/Gb mode; Stage 2 (Release 7)", 3GPP TS 43.129, V7.1.0. (Feb. 2007).

Third Generation Partnership Project, "Technical Specification Group GERAN; Packet-switched handover for GERAN A/Gb mode; Stage 2 (Release 7)", 3GPP TS 43.129;V7.2.0, (May 2007).

Third Generation Partnership Project, "Technical Specification Group Radio Access Network; Radio resource managemetn strategies (Release 5)," 3GPP TR 25.922 V5.4.0 (Dec. 2006).

Third Generation Partnership Project, "Technical Specification Group Geran; Packet-switched handover for GERAN A/Gb mode; Stage 2 (Release 7)", 3GPPTS 43.129, V7.1.0, (Feb. 2007).

Third Generation Partnership Project, "Technical Specification Group Services and System Aspects; 3GPP System Architecture Evolution: Report on Technical Options and Conclusions (Release 8),", 3GPP TR 23.882, V1.15.0, (Mar. 2008).

Third Generation Partnership Project, "Technical Specification Group Services and System Aspects; 3GPP System Architecture Evolution; Architecture Enhancements for non-3GPP accesses; Release 8", 3GPP TS 23.402, V1.0.0, (May 2007).

IEEE Computer Society and the IEEE Microwave Theory and Techniques Society, "IEEE Standard for Local and Metropolitan Area Networks Part 16: Air Interface for Fixed Broadband Wireless Access Systems", IEEE Std 802.16—2004, (Oct. 1, 2004).

LAN MAN Standards Committee of the IEEE Computer Society, "Information Technology—Telecommunications and Information Exchange Between Systems—Systems—Local and Metropolitan Area Networks—Specific Requirements—Part 11: Wireless LAN Medium Access Control (MAC) and Physical Layer (PHY) Specifications", ANSI/IEEE Std 802.11, 1999 Edition (R2003), (Reaffirmed Jun. 12, 2003).

Third Generation Partnership Project, "Technical Specification Group Services and System Aspects; General Packet Radio Service (GPRS) enhancements for Evolved Universal Terrestrial Radio Access Network (E-UTRAN) access (Release 8)", 3GPP TS 23.401,V8.1.0, (Mar. 2008).

Third Generation Partnership Project, "Technical Specification Group Services and System Aspects; General Packet Radio Service (GPRS) enhancements for Evolved Universal Terrestrial Radio Access Network (E-UTRAN) access (Release 8)", 3GPP TS 23.401, V.1.0.0, (May 2007).

Third Generation Partnership Project, "Technical Specification Group Radio Access Network; Radio resource management strategies (Releasee 1999)," 3GPP TR 25.922 V3.9.0 (Dec. 2006).

Third Generation Partnership Project, "Technical Specification Group Radio Access Network; Radio Resoure Control (RRC); Protocol Specification (Release 8)," 3GPP TS 25.331 V8.2.0 (Mar. 2008).

IEEE Computer Society, "Information Technology—Telecommunications and Information Exchange Between Systems—Local and Metropolitan Area Networks—Specific Requirements—Part 11: Wireless LAN Medium Access Control (MAC) and Physical Layer (PHY) Specifications", IEEE Std 802.11-2007 (Revision of IEEE Std 802.11-1999), (Jun. 12, 2007).

Jee et al., "Handover Flow Diagrams Update," IEEE 802.21 Media Independent Handover, DCN: 21-07-0205-01-0000 (May 14, 2007).

Third Generation Partnership Project, "Technical Specification Group GERAN; Packet-switched handover for GERAN A/Gb mode; Stage 2 (Release 6)", 3GPP TS 43.129, V6.11.0, (Feb. 2007).

Third Generation Partnership Project, "Technical Specification Group Services and System Apects; 3GPP System Architecture Evolution: Architecture Enhancements for non-3GPP accesses; Release 8", 3GPP TS 23.402, V0.4.0, (Apr. 2007).

Third Generation Partnership Project, "Technical Specification Group Services and System Aspects; 3GPP System Architecture Evolution: Architecture Enhancements for non-3GPP accesses; Release 8", 3GPP TS 23.402, V8.1.1, (Mar. 2008).

Third Generation Partnership Project, "Technical Specification Group Radio Access Network; Radio resource management strategies (Release 7)," 3GP TR 25.922 V7.1.0 (Mar. 2007).

Third Generation Partnership Project, "Technical Specification Group Radio Access Network; Radio Resource Control (RRC); Protocol Specification (Release 7)," 3GPP TS 25.331 V7.1.0 (Jun. 2006).

BT et al., "Architecture for Optimized Handovers Between Mobile WiMAX Access and 3GPP Access (TS 23.402)", 3GPP TSG SA WG2 Architecture—S2#61, S2-075605, (Ljubljana, Slovenia, Nov. 12-16, 2007).

Ericsson, "S1 Procedure Descriptions: S1 Handover Procedures," 3GPP TSG-RAN WG3 #56, R3-070917 (May 7-11, 2007).

IEEE Computer Society and the IEEE Microwave Theory and Techniques Society, "IEEE Standard for Local and Metropolitan Area Networks Part 16: Air Interface for Fixed Broadband Wireless Access Systems", IEEE Std 802.16-2004, (Oct. 1, 2004).

IEEE Computer Society, "Information Technology—Telecommunications and Information Exchange Between Systems—Local and Metropolitan Area Networks—Specific Requirements—Part 11: Wirless LAN Medium Access Control (MAC) and Physical Layer (PHY) Specifications", IEEE Std 802.11-2007 (Revision of IEEE Std 802.11-1999), (Jun. 12, 2007).

IEEE P802.21/D03.00, Draft IEEE Standard for Local and Metropolitan Area Networks: Media Independent Handover Services (Dec. 2006).

Jee et al., "Handover Flow Diagrams Update," IEEE 802.21 Media Independent Handover, DCN: 21-07-0205-01-0000 (May 14, 2007)..

LAN MAN Standards Committee of the IEEE Computer Society, "Draft Standard for Local and Metropolitan Area Networks: Media Independent Handover Services", IEEE P802.21/D05.00, (Apr. 2007).

LAN MAN Standards Committee of the IEEE Computer Society, "Draft Standard for Local and Metropolitan Area Networks: Media Independent Handover Services", IEEE P802.21/D8.0, (Dec. 2007).

LAN MAN Standards Committee of the IEEE Computer Society, "Draft Standard for Local and Metropolitan Area Networks: Media Independent Handover Services", IEEE P802.21/D10.0, (Apr. 2008).

LAN MAN Standards Committee of the IEEE Computer Society, "Draft Standard for Local and Metropolitan Area Networks: Media Independent Handover Services", IEEE P802.21/D00.05, (Jan. 2006).

LAN MAN Standards Committee of the IEEE Computer Society, "Information Technology—Telecommunications and Information Exchange Between Systems—Local and Metropolitan Area Networks—Specific Requirements—Part 11: Wireless LAN Medium Access Control (MAC) and Physical Layer (PHY) Specifications", ANSI/IEEE Std 802.11, 1999 Edition (R2003), (Reaffirmed Jun. 12, 2003).

Samsung, "Mobility in 3GPP 2G, 3G and Inter 2G/3G", TSG-RAN Workshop on Radio Mobility with Non-3GPP Radio Technologies, MOB-070005, (Busan, Korea, May 28, 2007).

Siemens AG, "Transparent and CN to MS Containers," 3GPP TSG GERAN #21 Meeting, GP-041938 (Aug. 23-27, 2004).

Third Generation Partnership Project, "Technical Specification Group GERAM; Packet-switched handover for GERAN A/Gb mode; Stage 2 (Release 6)", 3GPP TS 43.129, V6.11.0, (Feb. 2007).

Third Generation Partnership Project, "Technical Specification Group GERAN; Packet-switched handover for GERAN A/Gb mode; Stage 2 (Release 6)", 3GPP TS 43.129, V6.12.0, (May 2007).

Third Generation Partnership Project, "Technical Specification Group GERAN; Packet-switched handover for GERAN A/Gb mode; Stage 2 (Release 7)", 3GPP TS 43.129, V7.1.0, (Feb. 2007).

Third Generation Partnership Project, "Technical Specification Group GERAN; Packet-switched handover for GERAN A/Gb mode; Stage 2 (Release 7)", 3GPP TS 43.129, V7.2.0, (May 2007).

Third Generation Partnership Project, "Technical Specification Group Services and System Aspects; 3GPP System Architecture Evolution: Report on Technical Options and Conclusions (Release 7)", 3GPP TR 23.882, V1.9.0, (Mar. 2007).

Third Generation Partnership Project, "Technical Specification Group Services and System Aspects; 3GPP System Architecture Evolution: Report on Technical Options and Conclusions (Release 8)", 3GPP TR 23.882, V1.15.0, (Mar. 2008).

Third Generation Partnership Project, "Technical Specification Group Services and System Aspects; General Packet Radio Service (GPRS) enhancements for Evolved Universal Terrestrial Radio Access Network (E-UTRAN) access (Release 8)", 3GPP TS 23.401, V1.0.0, (May 2007).
Third Generation Partnership Project, "Technical Specification Group Services and System Aspects; General Packet Radio Service (GPRS) enhancements for Evolved Universal Terrestrial Radio Access Network (E-UTRAN) access (Release 8)", 3GPP TS 23.401, V0.4.1, (Apr. 2007).
Third Generation Partnership Project, "Technical Specification Group Services and System Aspects; General Packet Radio Service (GPRS) enhancements for Evolved Universal Terrestrial Radio Access Network (E-UTRAN) access (Release 8)", 3GPP TS 23.401, V8.1.0, (Mar. 2008).
Third Generation Partnership Project, "Technical Specification Group Services and System Aspects; 3GPP System Architecture Evolution: Architecture Enhancements for non-3GPP accesses; Release 8", 3GPP TS 23.402, V1.0.0, (May 2007).
Third Generation Partnership Project, "Technical Specification Group Services and System Aspects; 3GPP System Architecture Evolution: Architecture Enhancements for non-3GPP accesses; Release 8", 3GPP TS 23.402, V0.4.0, (Apr. 2007).
Third Generation Partnership Project, "Technical Specification Group Services and System Aspects; 3GPP System Architecture Evolution: Architecture Enhancements for nom-3GP accesses; Release 8", 3GPP TS 23.402, V8.1.1, (Mar. 2008).
Third Generation Partnership Project, "Technical Specification Group Radio Access Network; Radio resource management strategies (Release 1999)," 3GPP TR 25.922 V3.9.0 (Dec. 2006).
Third Generation Partnership Project, "Technical Specification Group Radio Access Network; Radio resource management strategies (Release 4)," 3GPP TR 25.922 V4.4.0 (Dec. 2006).
Third Generation Partnership Project, "Technical Specification Group Radio Access Network; Radio resource management strategies (Release 5)," 3GPP TR 25.922 V5.4.0 (Dec. 2006).
Third Generation Partnership Project, "Technical Specification Group Radio Access Network; Radio resource management strategies (Release 6)," 3GPP TR 25.922 V6.4.0 (Dec. 2006).
Third Generation Partnership Project, "Technical Specification Group Radio Access Network; Radio resource management strategies (Release 7)," 3GPP TR 25.922 V7.0.0 (Dec. 2006).
Third Generation Partnership Project, "Technical Specification Group Radio Access Network; Radio resource management strategies (Release 7)," 3GPP TR 25.922 V7.1.0 (Mar. 2007).
Third Generation Partnership Project, "Technical Specification Group Radio Access Network; Radio Resource Control (RRC); Protocol Specification (Release 4)," 3GPP TS 25.331 V4.17.0 (Mar. 2005).
Third Generation Partnership Project, "Technical Specification Group Radio Access Network; Radio Resource Control (RRC); Protocol Specification (Release 4)," 3GPP TS 25.331 V4.18.0 (Dec. 2007).
Third Generation Partnership Project, "Technical Specification Group Radio Access Network; Radio Resource Control (RRC); Protocol Specification (Release 5)," 3GPP TS 25.331 V5.19.0 (Dec. 2006).
Third Generation Partnership Project, "Technical Specification Group Radio Access Network; Radio Resource Control (RRC); Protocol Specification (Release 5)," 3GPP TS 25.331 V5.21.0 (Dec. 2007).
Third Generation Partnership Project, "Technical Specification Group Radio Access Network; Radio Resource Control (RRC); Protocol Specification (Release 6)," 3GPP TS 25.331 V6.13.0 (Mar. 2007).
Third Generation Partnership Project, "Technical Specification Group Radio Access Network; Radio Resource Control (RRC); Protocol Specification (Release 6)," 3GPP TS 25.331 V6.17.0 (Mar. 2008).
Third Generation Partnership Project, "Technical Specification Group Radio Access Network; Radio Resource Control (RRC); Protocol Specification (Release 7)," 3GPP TS 25.331 V7.10 (Jun. 2006).
Third Generation Partnership Project, "Technical Specification Group Radio Access Network; Radio Resource Control (RRC); Protocol Specification (Release 7)," 3GPP TS 25.331 V7.4.0 (Mar. 2007).
Third Generation Partnership Project, "Technical Specification Group Radio Access Network; Radio Resource Control (RRC); Protocol Specification (Release 7)," 3GPP TS 25.331 V7.8.0 (Mar. 2008).
Third Generation Partnership Project, "Technical Specification Group Radio Access Network; Radio Resource Control (RRC); Protocol Specification (Release 8)," 3GPP TS 25.331 V8.2.0 (Mar. 2008).
Third Generation Partnership Project, "Technical Specification Group Radio Access Network; UTRAN Iu interface RANAP signaling (Release 4)," 3GPP TS 25.413 V4.12.0 (Mar. 2004).
Third Generation Partnership Project, "Technical Specification Group Radio Access Network; UTRAN Iu interface RANAP signaling (Release 6)," 3GPP TS 25.413 V6.13.0 (Mar. 2007).
Third Generation Partnership Project, "Technical Specification Group Radio Access Network; UTRAN Iu interface RANAP signaling (Release 6)," 3GPP TS 25.413 V6.16.0 (Dec. 2007).
Third Generation Partnership Project, "Technical Specification Group Radio Access Network; UTRAN Iu interface RANAP signaling (Release 1999)," 3GPP TS 25.413 V3.14.0 (Sep. 2003).
Third Generation Partnership Project, "Technical Specification Group Radio Access Network; UTRAN Iu interface RANAP signaling (Release 5)," 3GPP TS 25.413 V5.12.0 (Jun. 2005).
Third Generation Partnership Project, "Technical Specification Group Radio Access Network; UTRAN Iu interface RANAP signaling (Release 7)," 3GPP TS 25.413 V7.8.0 (Dec. 2007).
Third Generation Partnership Project, "Technical Specification Group Radio Access Network; UTRAN Iu interface RANAP signaling (Release 7)," 3GPP TS 25.413 V7.5.0 (Mar. 2007).
Universal Mobile Telecommunications System (UMTS); Radio Resource Management Strategies (3GPP TR 25.922 version 6.3.0 Release 6), ETSI TR 125 922 V6.3.0 (Mar. 2006).
Zuniga et al., "IEEE 802.21 Media Independent Handover Services Resource List Definition," IEEE802.21-07/320r0 (Sep. 18, 2007).
Zuniga et al., "IEEE 802.21 Media Independent Handover Services Resource List Definition," IEEE802.21-07/164r2 (Jun. 10, 2007).

* cited by examiner

HETEROGENEOUS NETWORK HANDOVER-SUPPORT MECHANISM

CROSS REFERENCE TO RELATED APPLICATIONS

This application claims the benefit of U.S. provisional applications 60/942,364 filed on Jun. 6, 2007, and 60/944,696 filed on Jun. 18, 2007, which are incorporated by reference as if fully set forth.

TECHNOLOGY FIELD

The subject matter disclosed is related to wireless communications. More particularly, the subject matter is related to supporting media independent handover (MIH).

BACKGROUND

The IEEE 802.21 standard provides a uniform set of functionalities that help enable and enhance handovers across different link layer technologies. IEEE 802.21 defines three main services available to Mobility Management applications, such as Client Mobile Internet Protocol (Client MIP) or Proxy MIP. Referring to FIG. 1, these services are the Event Service 100, the Information Service 105 and the Command Service 110. These services aid in the management of handover operations, system discovery and system selection by providing information and triggers from lower layers 115 to upper layers 120 via a media independent handover (MIH) function (MIHF) 125.

At a high level, this involves an upper layer MIH User which can communicate with an MIH Function 125 (either locally or remotely over some transport medium) through link-independent Event Service 100, Information Service 105 and Command Service 110. The MIH Function 125, in turn, will interact with link-layer devices through the use technology-specific primitives; the functionalities expected from these technology-specific primitives are defined in the 802.21 standard. While FIG. 1 shows MIHF 125 as a middle layer in a protocol stack, MIHF 125 may also be implemented as an MIH plane that is capable of exchanging information and triggers directly with different layers of the protocol stack.

The Third Generation Partnership Project (3GPP) has identified three principles that describe how inter-system handovers between 3GPP and non-3GPP access (e.g. 3GPP2, IEEE 802.11 WLAN, IEEE 802.16 WiMAX, etc.) should be handled. However, these principles do not address how two different accesses can be integrated in order to allow handover execution. The first principle applies in multiple RAT scenarios where the wireless transmit/receive unit (WTRU) uses a single radio access technology (RAT) for all in-progress services. The second principle is that the Inter-RAT handover decision is made and the handover command is sent by the serving Radio Access Network (RAN). The target RAN may exercise admission control to the WTRUs that are handed over. The third principle is that the serving RAN receives information from the target RAN that can be included in the handover command.

All these principles can be met by using the handover (HO) service provided by the 802.21 standard. This is especially needed when handover commands requesting a switch over toward or from a 3GPP based access is required, for example, when a handover takes place between IEEE 802.16 or WiMAX accesses and 3GPP accesses, or between IEEE 802.11 or WLAN systems and 3GPP systems.

FIG. 2 depicts a typical GSM Edge Radio Access Network—UMTS Terrestrial Radio Access Network (GERAN-UTRAN) 3GPP packet switched (PS-domain) Inter-RAT architecture 200. Referring to FIG. 2, the source network includes a serving GPRS support node SGSN 205, a base station controller/radio network controller (BSC/RNC) 210, and a base transceiver station (BTS)/Node B 215. The BSC/RNC 210 communicates with the SGSN 205 through a Gb/IuPS interface 220. In addition, the BSC/RNC 210 communicates with the BTS/Node B 215 through an Abis/Iub interface 225. The target network includes a SGSN 230, a BSC/RNC 235, and a BTS/Node B 240. The BSC/RNC 235 communicates with the SGSN 230 through a Gb/IuPS interface 245. The BSC/RNC 235 communicates with the BTS/Node B 240 through an Abis/Iub interface 250. The source and target SGSNs 205,230 communicate through a Gn interface 255.

Referring to FIG. 2, it is the source BSC/RNC 210 that controls the handover. The mobile node (MN) 260 is requested to take measurements in the target network and, upon meeting the handover conditions, the source BSC/RNC 210 requests the target BSC/RNC 235 to prepare the resources for the MN 260. The target BSC/RNC 235 performs admission control and responds with the new resource allocation. Once the new resources have been allocated, the source BSC/RNC 210 commands the MN 260 to handover to the new network. Upon detecting the MN 260 in the new network, the target BSC/RNC 235 informs the source BSC/RNC 210 of the handover completion.

In order to perform heterogeneous handover between a 3GPP and non-3GPP network, the network architecture must provide capability for an MIH User to acquire measurement reports and capability for an MIH Function to reserve link layer resources through the use of standardized MIH primitives and messages. While the 802.21 standard provides mechanisms to obtain such measurement reports, query for resources, reserve these resources, execute the handover and inform the peer network about the completion of the action, the mechanisms have deficiencies that deprive implementers from the use of key functionalities and from complete control of the measurement-reporting process. This is specifically true for handover between 3GPP (e.g. GERAN, UTRAN and LTE) and non-3GPP networks, which are also known as Inter-Radio Access Technology (Inter-RAT) handovers.

When two peer networks are to perform a handover, typically based on Mobile Node (MN) (also referred to as User Equipment or UE) measurement reports, the network instructs the MN to switch to another cell and indicates what configuration to use in the new cell. This implies that the Inter-RAT handover decision is made by the serving Radio Access Network (RAN), whereas the target RAN may exercise admission control on the MN that is being handed over.

Hence, the sequence of events is 1) a Query phase used to determine the status of resources at both source and target networks before taking a handover decision, 2) a Preparation phase where resources are reserved at the target network once a handover decision has been taken, 3) an Execution phase when the handover commands are sent and performed, and 4) a Completion phase when the result of the handover is informed and the original resources are released.

The IEEE 802.21 specification defines messages that can be used to perform the actions described above. However, the functionality provided by the currently defined messages is insufficient to convey all the required information between source and target networks, especially in the case of 3GPP to non-3GPP handover (and vice versa). It would therefore be desirable to provide messages to convey all the required information between source and target networks without compromising functionality. In order to perform heterogeneous handover between a 3GPP and non-3GPP network, it would also be desirable to design a network architecture to provide capability for an MIH User to acquire measurement reports and capability for an MIH Function to reserve link layer resources through the use of standardized MIH primitives and messages.

SUMMARY

A method and apparatus for access-independent mobility management. The method and apparatus are used in handover between 3GPP and non-3GPP networks which use enhanced media independent handover functionalities.

BRIEF DESCRIPTION OF THE DRAWINGS

A more detailed understanding may be had from the following description, given by way of example and to be understood in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, a mobile node (MN), or any other type of user device capable of operating in a wireless environment. When referred to hereafter, the terminology "base station" includes but is not limited to a Node-B, an Enhanced Node-B (eNB), a site controller, an access point (AP), or any other type of interfacing device capable of operating in a wireless environment.

The embodiments below are described in reference to the 802.21 protocol and messages for simplicity. Although the embodiments described below refer to messages defined in the 802.21 protocol, the concepts can be applied messages defined in other technologies containing similar information elements to 802.21 messages.

IEEE 802.21 services, for example, and in particular Command and Information services, can be used to integrate multiple access technologies. This includes system architecture that show where the Media Independent Handover function can be placed in order to allow this integration. Also included is a mechanism that shows how mobility principles, as outlined by 3GPP standards, can be met using the proposed architecture. Through the use of services provided by the MIH Function, a mobility mechanism supporting Handover between 3GPP and non-3GPP access can be realized. The location of the MIH function within the 3GPP architecture is logically distributed and it might depend on the level of integration that is desired, that is, whether a tight coupling or a loose coupling scenario is being addressed.

Three logical components, i.e., the MME, the Gateway, and the IP server, can be identified. These logical components can communicate amongst each other or act independently depending on specific deployment scenarios. Logically the MIH function could also reside within a specific access if a particular deployment warrants it.

Figure 1:
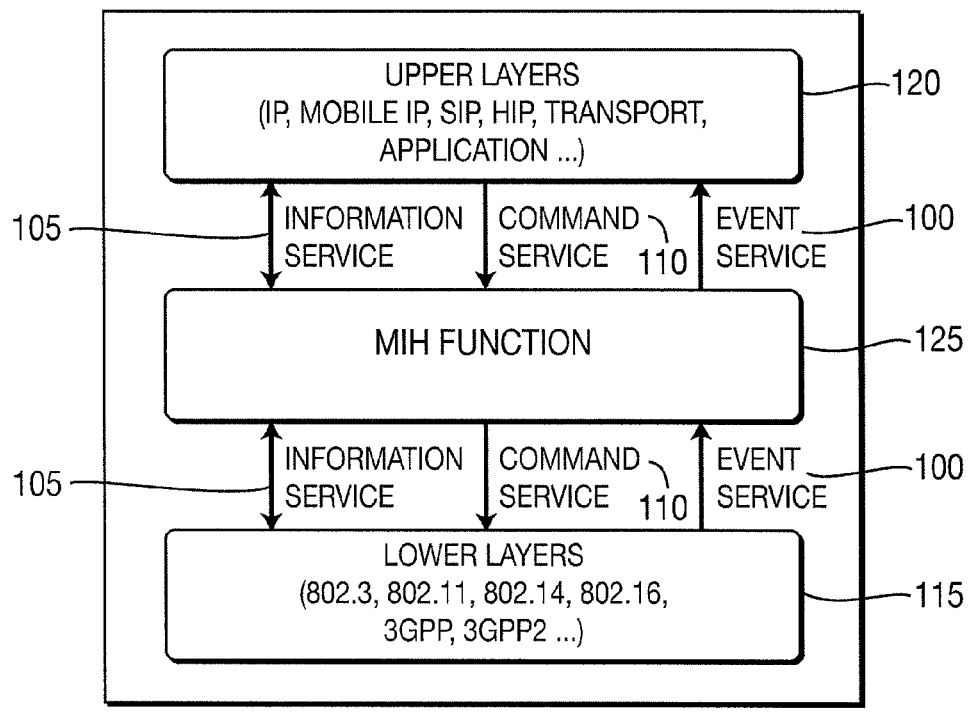
FIG. 1 is an IEEE 802.21 protocol architecture according to the prior art.
Figure 2:
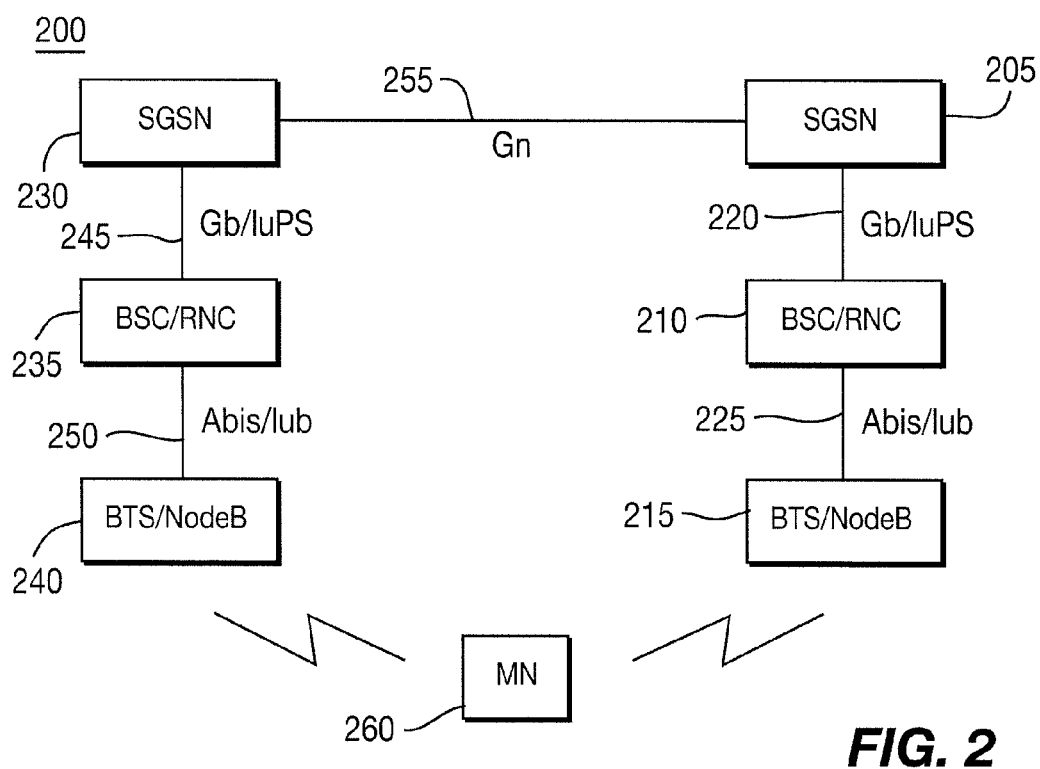
FIG. 2 is a block diagram for a 3GPP PS-domain Inter-RAT architecture according to the prior art.

The basic functionality for the 3GPP architecture is defined in FIG. 2 above. Using the basic architecture from FIG. 2, the following three network architectures can be derived for the non-3GPP case to support heterogeneous handover.

Figure 3:
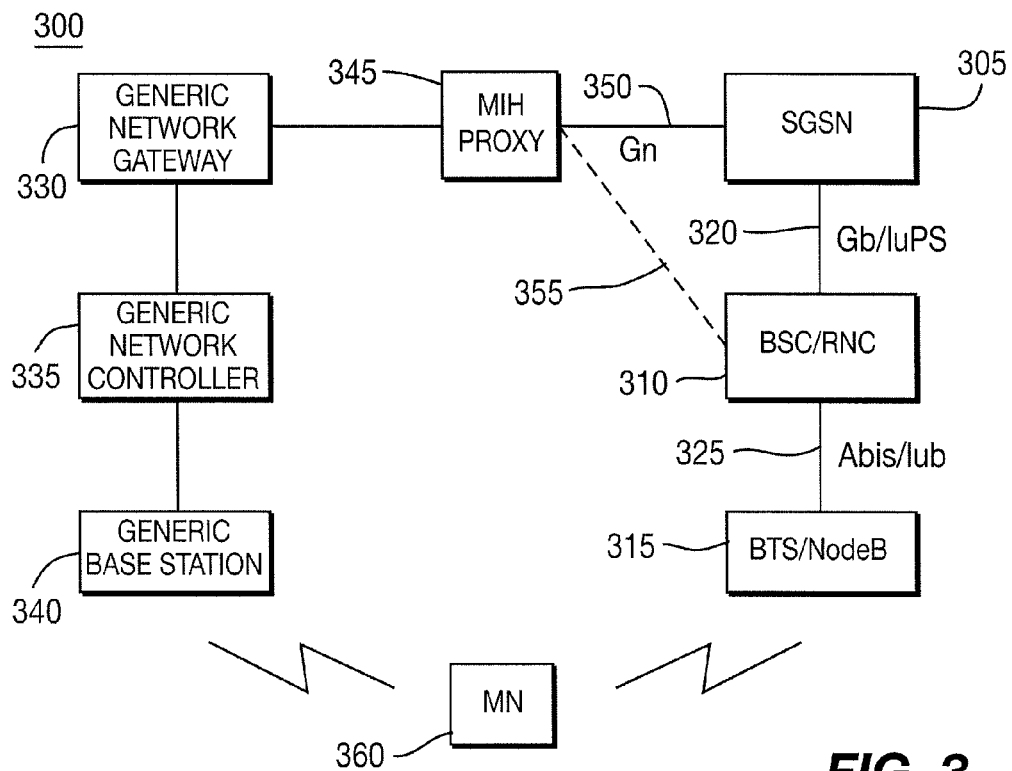
FIG. 3 is a block diagram of a system performing Inter-RAT Handover with a Proxy MIH Node.

FIG. 3 shows one possible architecture 300 that can be used to support the heterogeneous handover between 3GPP and non-3GPP networks. Referring to FIG. 3, the source network includes a SGSN 305, a base station controller/radio network controller (BSC/RNC) 310, and a BTS/Node B 315. The BSC/RNC 310 communicates with the SGSN 305 through a Gb/IuPS interface 320. In addition, the BSC/RNC 310 communicates with the BTS/Node B 315 through an Abis/Iub interface 325. The target network includes a Generic Network Gateway 330, a Generic Network Controller 335, and a Generic Base Station 340.

Referring to FIG. 3, an 802.21 MIH node 345 is used to translate and act as a proxy between the Generic Network Gateway 330 and the 3GPP SGSN 305. If a conventional SGSN is used, the handover messages communicated between the MIH Proxy 345 and the SGSN 305 would be the same as described in the 3GPP Gn interface 350. If the network is small, or the SGSN 305 and BSC/RNC 310 are collocated, the MIH Proxy 345 could connect directly to the BSC/RNC 310 by using Iu messages 355.

Figure 4:
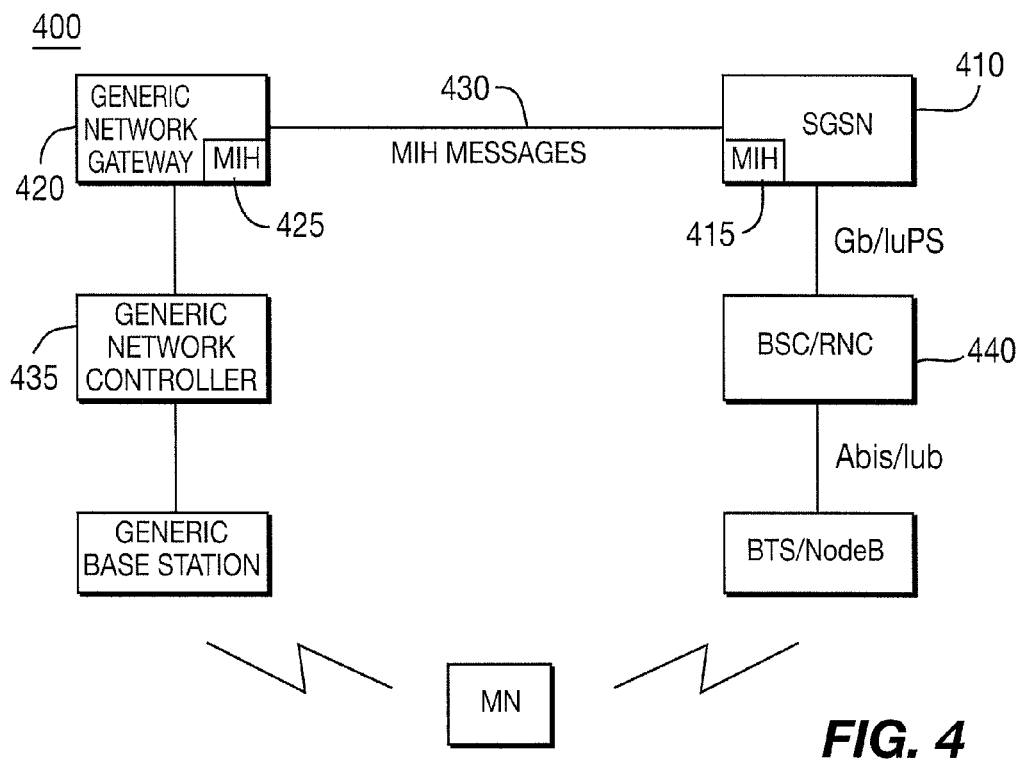
FIG. 4 is a block diagram of a system performing for an Inter-RAT Handover with an MIH-capable SGSN/Network Controller.

FIG. 4 shows another possible network architecture 400 to perform an Inter-RAT Handover with MIH-capable SGSN/Network Controller. Referring to FIG. 4, it is assumed that the SGSN 410 and Generic Network Gateway 420 implement MIH capabilities 415,425, and therefore are capable of communicating one to another with MIH messages 430, such as messages defined in the 802.21 protocol or messages defined in other technologies containing similar information elements to 802.21 messages.

A similar approach could be applied where the Generic Network Controller 435 and BSC/RNC 440 were MIH-capable. For this approach, these two nodes would be able to communicate with MIH messages without passing through the gateways. For simplicity, this approach is not shown in FIG. 4.

Figure 5:
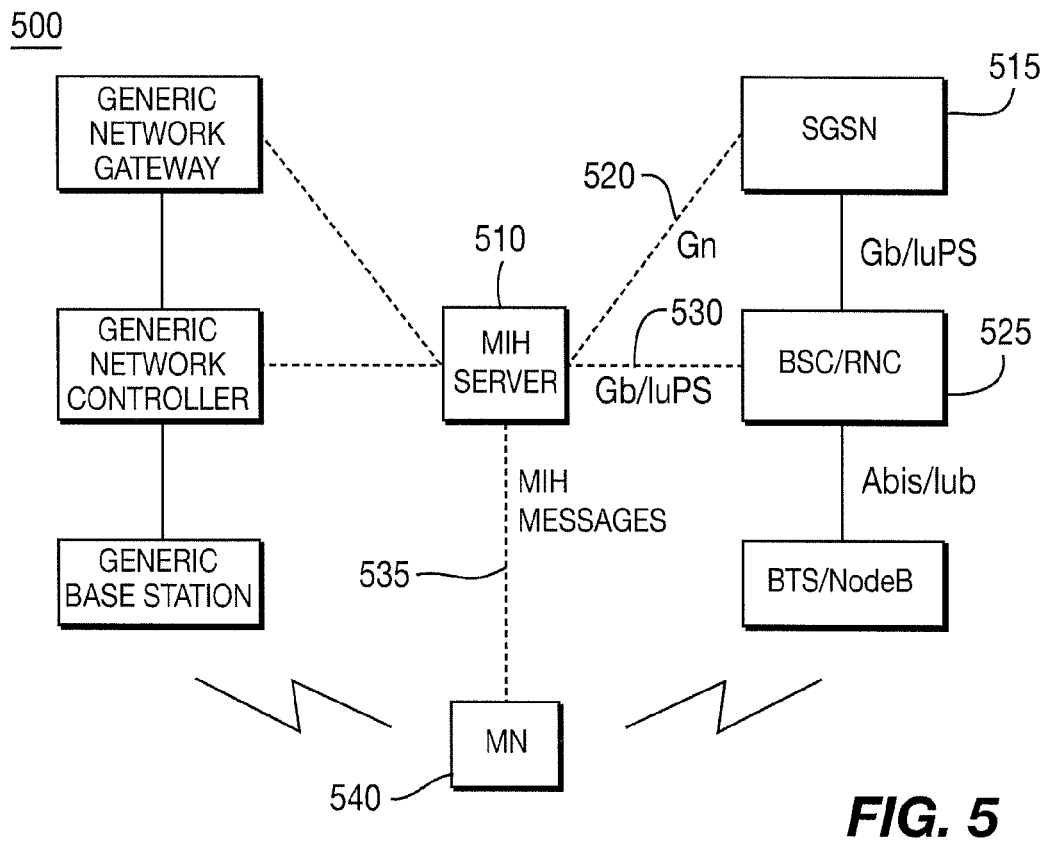
FIG. 5 is a block diagram of a system performing an Inter-RAT Handover with MIH Server.

FIG. 5 shows an alternative network architecture 500 for an Inter-RAT Handover with MIH Server. In this architecture, the MIH Server 510 acts on behalf of the Network Controller for taking handover decisions (e.g. as source Network Controller) and setting up the resources at the target network. In this figure, it is shown that the MIH Server 510 can communicate to the SGSN 515, for example, through a Gn interface 520, and/or to the BSC/RNC 525, for example, through a Gb/Iu interface 530. Also in this figure, the MIH Server 510 communicates directly to the mobile Node (MN) 535 via L2/L3 protocols (e.g. 802.11, 802.16, IP, etc.) 540.

In order to support heterogeneous handover between a 3GPP and a non-3GPP network, media independent handover messages can be used. For instance, the existing 802.21 standard messages or other technologies standards can be updated to include the following messages:
 MIH_N2N_HO_Commit request; and
 MIH_N2N_HO_Commit response.

By including these two messages, the MIH network functionality (or similar network functionality) has the capability to reserve resources when two networks control the handover, similar to the 3GPP networks.

Although the 802.21 standard, for example, can be updated to include the required messages, the contents of these messages do not fulfill the requirements of the 3GPP network handover. Hence, an enhancement to the MIH messages is required to support handovers between 3GPP and non-3GPP networks. This enhancement would follow the Inter-RAT Handover (GERAN/UTRAN) philosophy described in the background section above.

The enhanced messages and their encoding, e.g., TLV IEs (Type-Length-Value Information Elements), are discussed in the embodiments below. Where the networks are not pre-configured with each other's parameters, the source network can request the target network about the available resources (e.g. cell list, cell parameters, etc.). For this, the source network can either ask the target to report on all available resources, or on a specific type of network.

In one embodiment, this information could be included in the following MIH Messages:
 N2N Query Resources Request (from source to target network to request reporting on available resources that could be used by the source to handover).
 MN HO Query Request (from mobile to target network to request reporting on available resources that could be used by the source to handover).

One possibility is to use the Network Type element to request information about a specific network. Another possibility is to include the network information as part of the Available Resource field of the above mentioned message as a suggestion from the source.

Figure 6:
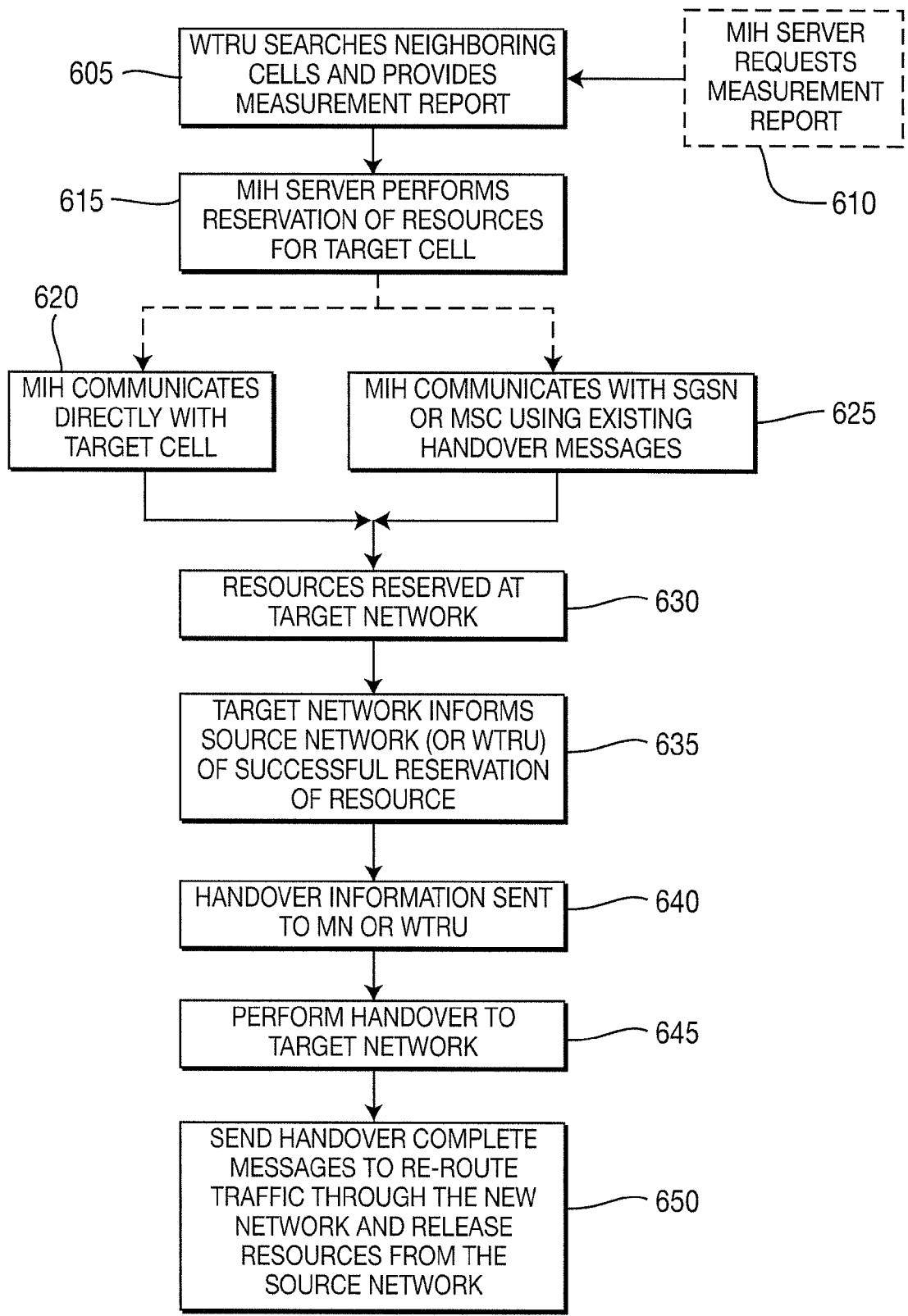
FIG. 6 is a block diagram of a system performing Inter-RAT Handover.

FIG. 6 shows how the updated handover messages can be used to perform an Inter-RAT Handover 600. Before the handover process starts, it is required for the WTRU to start searching neighboring cells 605 and provide measurements. In order to perform such measurements for 3GPP GERAN/UTRAN/LTE or non-3GPP networks, neighbor list and measurement information is required by WTRU to take measurements on neighbor cells. Thresholds and event criteria (i.e., when to report measurements), periodicity of measurements, and number of cells to report can optionally be included in this information.

In one embodiment, the information required for 3GPP GERAN/UTRAN/LTE or non-3GPP networks could be included in the following enhanced MIH Messages:
 N2N Query Resources Response (from target to source network to inform the available cells that should be scanned in the network);
 Net HO Query Request (from source network controller to MN to let the MN know which cells to monitor); and
 MIH Scan Request (from source network controller to MN to let the MN know which cells to monitor).

One possibility is to include the information as part of the Available Resource field of the above mentioned enhanced messages.

Referring to FIG. 6, when MIH server requests reports 610, or the WTRU independently triggers a measurement report 605, the required information, such as the cell ID of the best cell or list of best cells, could be included in the following enhanced MIH Messages:
 Link Parameter Report (from MN to the network to report on measurements);
 Net HO Query Response (from MN to the network to respond to the query request and report on measurements); and
 MIH Scan Response (from MN to the network to respond to the request and report on measurements).

One possibility is to include the information as part of the Link Parameters, Link Resource, or Scan Response fields of the above mentioned enhanced messages.

Referring to FIG. 6, upon receiving a measurement report, the MIH server performs reservation of resources for the target cell 615. To perform a reservation, the MIH can communicate directly to the target SGSN or mobility management entity (MME) 620 or alternatively to the eNB, RNC or MSC 625 by making use of existing handover messages, such as "Prepare Handover".

The required information to reserve resources on the target network could be included in the following enhanced MIH Messages:
 N2N HO Commit Request (from source to target network to request reservation of the resources); and
 MN HO Commit Request (from MN to network to request reservation of the resources).

This information could, in one embodiment, be included in the Query Resource, or Reserve Resource fields of the above mentioned enhanced messages.

Referring to FIG. 6, once the resources have been reserved by the target network 630, the source network (or WTRU) is informed about the successful reservation of resources 635 so that the handover can take place. Hence, the information required by the MN to make the connection to the new network could be included in the following updated MIH Messages:
 N2N HO Commit Response (from target to source network to report reservation of the resources);
 MN HO Commit Response (from network to MN to report reservation of the resources); and
 Net HO Commit Request (from the network to the MN to report reservation of resources and command the MN to handover to these resources).

This information could, in one embodiment, be included in the Query Resource, or Reserve Resource fields of the above mentioned messages.

Referring to FIG. 6, once the reservation of resources is complete, the handover information is sent to the MN or WTRU 640 in order to perform handover to the target network 645. Once the handover is complete, handover complete messages can be sent 650 to re-route traffic through the new network and release resources from the source network.

Depending on the type of network, the handover can be performed in a variety of ways. For GSM, once the BSC has reserved the radio resources of GERAN cell resources it has to give the necessary information for the WTRU to complete the handover and synchronize to the new cell. This information is transmitted to the WTRU via the source network in a transparent container. Such type of transparent container can be used in other types of network to convey the information of the radio resources either from source to target or vice versa.

The following information for the WTRU, transmitted in a transparent container, could be contained in the MIH message:
  Synchronization Indication (SI);
  Normal Cell Indication (NCI);
  ARFCN, BSIC-BCCH frequency and BSIC of new cell;
  CCN Support Description;
  Frequency parameters;
  Extended dynamic allocation;
  Network Control Order;
  RLC reset;
  Packet timing Advance;
  UL control timeslot;
  GPRS, EGPRS mode; and
  UL/DL TBFs (PFI, TFI assignment, TBF timeslot allocation, RLC mode, USF allocation);
  Optional:
  NAS container.

For UTRAN, once the RNC has reserved the radio resources for the cell id, it has to give the necessary information for the Mobile station to complete the handover and synchronize to the new cell. This information is transmitted to the WTRU via the source network in a transparent container.

The following information, transmitted in a transparent container in a MIH message, is required by the WTRU to make the connection to the 3G cell:
  WTRU identities (U-RNTI, H-RNTI, E-RNTI);
  Ciphering algorithm;
  RB information elements (SRB information to setup list, RAB information to setup list);
  UL/DL transport channel information (UL/DL Transport channel information common for all transport channels, Added or Reconfigured TrCH information UL/DL);
  UL radio resources (Uplink DPCH info, E-DCH Info);
  DL radio resources (Downlink HS-PDSCH Information, Downlink information per radio link, Downlink information common for all radio links);
  Frequency info; and
  Maximum allowed UL tx power.

In addition, the RNC may provide information for Commit time/activation for synchronous handovers.

Alternatively, predefined configurations can be used if the WTRU supports them. A predefined configuration will require less information to be transmitted to the WTRU:
  Default configuration mode (FDD, TDD);
  Default configuration identity;
  RAB info; and
  UL DPCH info.

The RNC may also provide MIH Complete Request/Response Messages. Once the MN has been handed over from the source to the target network, handover complete messages are sent to re-route traffic through the new network and release resources from the source network.

In one embodiment, this information could be included in the following enhanced MIH Messages:
  Net HO Commit Response;
  N2N Complete Request; and
  N2N Complete Response.

Figure 7:
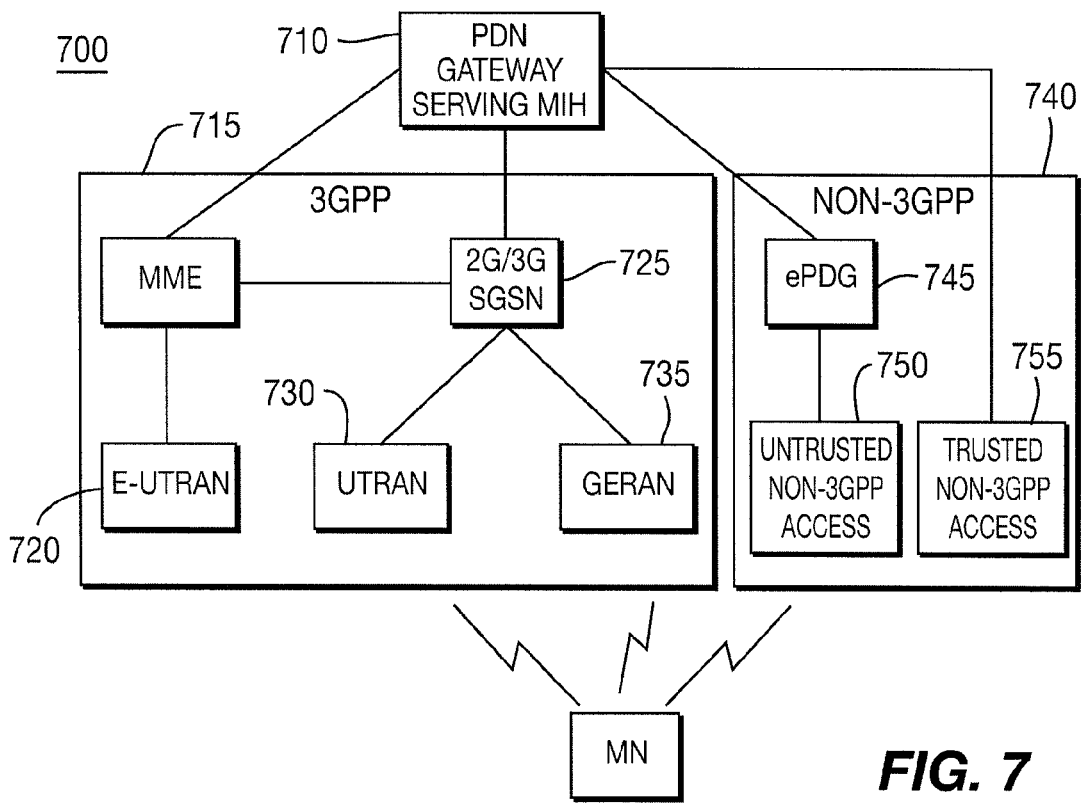
FIG. 7 is a block diagram of a system using media independent normalizing functions to interpret 3GPP commands and map their functionality into equivalent generic handover commands.
Figure 8:
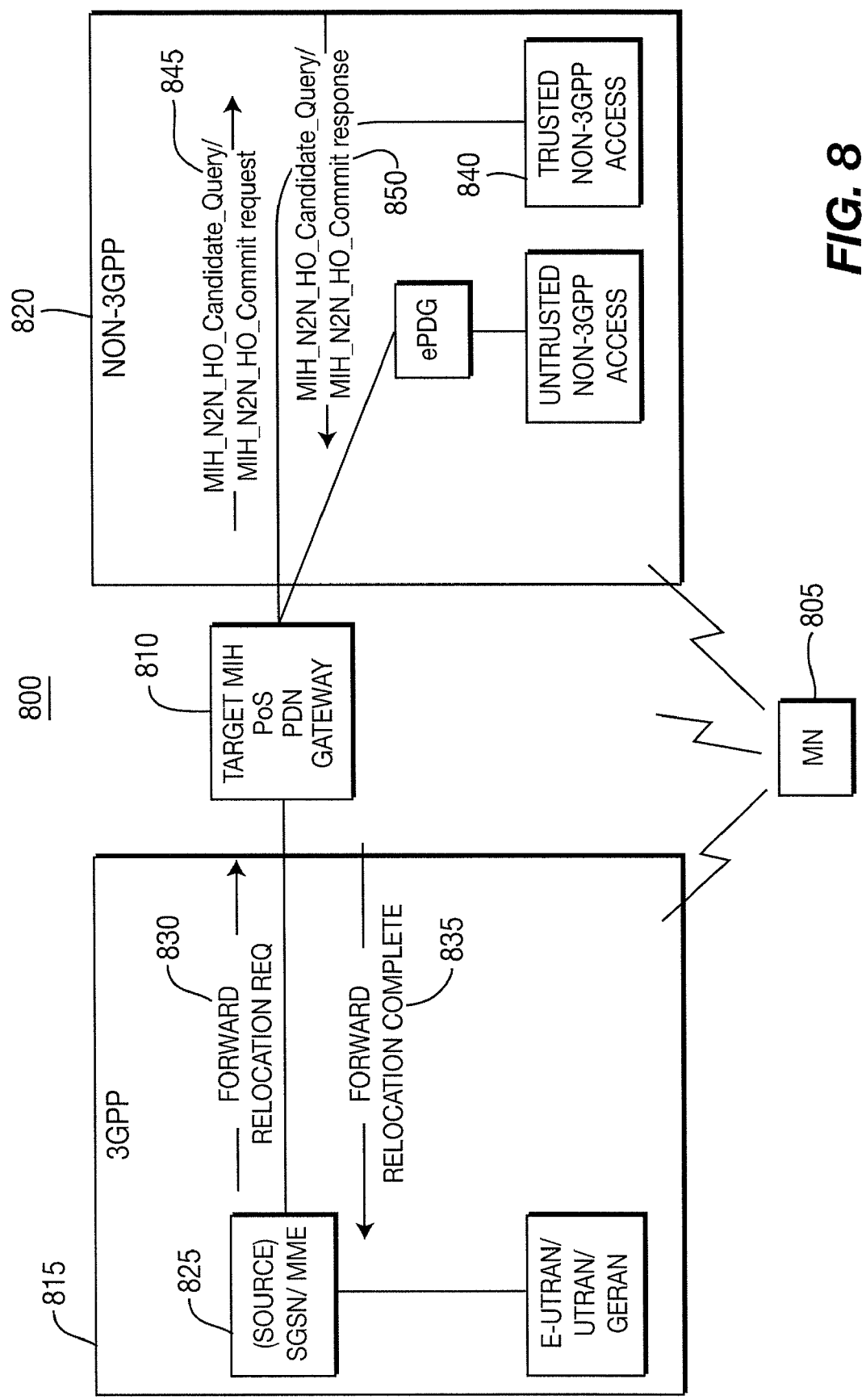
FIG. 8 is a block diagram of a system using media independent normalizing functions to interpret 3GPP commands and map their functionality into equivalent generic handover commands.
Figure 9:
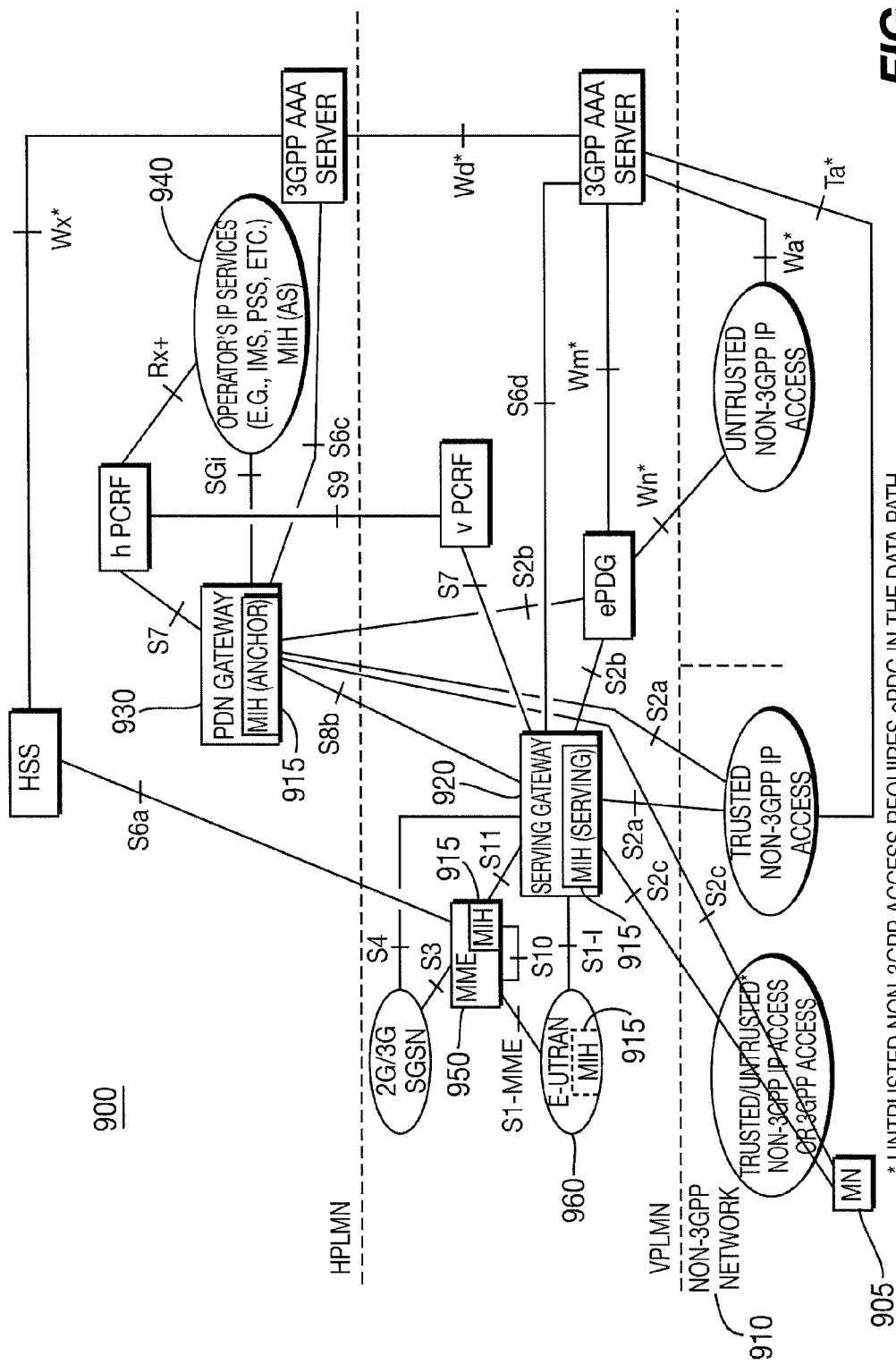
FIG. 9 shows a block diagram of a roaming scenario where the MN is in a visited network.

For LTE and other 3GPP technologies such as WCDMA and GERAN media independent normalizing functions can be used to interpret 3GPP commands and map their functionality into equivalent generic handover commands, such as the ones described in IEEE 802.21. FIGS. 7, 8 and 9 show how this media independent handover function can be logically placed, for example, within the PDN Gateway 710 as this is the central point of contact across multiple access systems. The 3GPP network 715 shown in FIG. 7 includes an MME 720 capable of supporting E-UTRAN 720 communications. The MME 720 is also in communication with a 2G/3G SGSN 725, which is capable of supporting UTRAN 730 and GERAN 735 communications. The non-3GPP network 740 includes an ePDG 745 capable of supporting untrusted non-3GPP access 750. The trusted non-3GPP access 755 is in direct communication with the PDN Gateway 710.

As described in FIG. 8, the WTRU 805 remains under the domain of 3GPP handover mechanism while the current connection is progress. The Target MIH PoS PDN Gateway 810 serves as the central point of contact between the 3GPP 815 and non-3GPP networks 820. The source SGSN/MME 825 can use Forward_Relocation_Req 830 and Forward_Relocation_Complete 835 messages to communicate with the Target MIH PoS PDN Gateway 810. The Trusted Non-3GPP Access 840 can use MIH_N2N_HO_CandidateQuery/MIH_N2N_HO_Commit request 845 and MIH_N2N_HO_Candidate_Query/MIH_N2N_HO_Commit response 850 messages to communicate with the Target MIH PoS PDN Gateway 810. Similarly, the MN can use HO Commit and Query request and response types of messages to trigger or initiate the handover and to obtain the required information for handover once the preparation is finished.

FIG. 9 shows an example of a roaming scenario 900 where the MN 905 is in a visited network 910. In this scenario, there are two gateways in which the MIH 915 could reside, the Serving Gateway 920 and the Anchor Gateway 930. This scenario may also include an IP server 940 which can communicate with the MN 905, for example using an IP interface. The MIH functionality 915 may also be located in the MME 950. This example is also be applicable to the home scenario. In an alternative embodiment, the MIH 915 may be located in E-UTRAN 960.

The WTRU may or may not be able to simultaneously support multi radio capabilities or only one radio technology at time. If multiple radio capabilities are supported either by using multi-radio or single-radio with on-off techniques, the WTRU might be able to measure radio environments from multiple accesses while still connected to the current access. Normalized measurement reporting capabilities, such as the ones described in 802.21, could be used to provide a service access point for measurement collection purposes, exposing a unified interface regardless of the underlying technology.

The WTRU might also rely on information provided via higher layers over the current access by using information services such as the ones provided by IEEE 802.21. This information allows the WTRU to request access relocation, even when no specific measurements are provided.

When preparing and reserving radio resources, the MIH Function is able to map the relocation request to a suitable MIH Command. This allows the target access system to exercise admission control functions prior to granting resources. The command that triggers the handover from the 3GPP access is generated entirely according to 3GPP specifications, possibly using information provided by the target access system via MIH mapping.

Table 1 below shows a possible mapping between the MIH, e.g., enhanced 802.21, and 3GPP GERAN/UTRAN/LTE messages that could be used, for instance, by the proxy function.

TABLE 1

| 802.21 | Gn | Iu | Gb | Air Interface | LTE (S11/S3/S4) |
|---|---|---|---|---|---|
| N2N Commit Request | Forward Relocation Request | Relocation Request | PS Handover Required | | Forward Relocation Request |
| N2N Commit Response | Forward Relocation Response | Relocation Request Ack | PS Handover Required Ack | | Forward Relocation Response |
| Net HO Commit Request | | | | PS Handover Command | PS HO Command |
| Net HO Commit Response | | | | HO to UTRAN Complete | HO to E-UTRAN Complete |
| N2N HO Complete Request | Forward Relocation Complete | Relocation Complete | | | Forward Relocation Complete |
| N2N HO Complete Response | Forward Relocation Complete Ack | | | | Forward Relocation Complete ACK |
| N2N Commit Request | | | | | Update Bearer Request |
| N2N Commit Response | | | | | Update Bearer Response |
| N2N Commit Request | | | | | Forward SRNS Context |
| N2N Commit Response | | | | | Forward SRNS Context ACK |
| N2N_HO_Candidate_Query Request | | | | | Forward Relocation Request |
| N2N_HO_Candidate_Query Response | | | | | Forward Relocation Response |
| N2N HO Complete Request | | | | | Update Bearer Request |
| N2N HO Complete Response | | | | | Update Bearer Response |

Tables 2-5 below show a possible realization combination of the message encoding that would carry the above mentioned parameters in a type-length-value (TLV) format.

TABLE 2

System Parameters List

| Type | Length | Value |
|---|---|---|
| XXX | Variable | Structure consisting of 1) Network Type, and 2) Network Specific System Parameters |

TABLE 3

Network Type

| Type | Length | Value |
|---|---|---|
| XXX | 8 | Network Type and Revision as defined in 802.21 standard |

TABLE 4

Network Specific Parameters

| Type | Length | Value |
|---|---|---|
| XXX | Variable | Network Specific System Parameters. 802.16: UCD, DCD, UIUC, DIUC GSM/GRPS/EDGE (GERAN): (defined depending on message type) 3GPP (UTRAN): (defined depending on message type) |

TABLE 5

HANDOVER COMPLETION

| Type | Length | Value |
|---|---|---|
| XXX Parameter type | Variable Integer | Type of network 0: IEEE 802.16 1: GERAN 2: 3GPP 3-7: Reserved |

TABLE 5-continued

HANDOVER COMPLETION

| Type | Length | Value |
|---|---|---|
| System parameter Value | Variable | Depending on the parameter type<br>0: UCD, DCD, UIUC, DIUC<br>1: (defined depending on message type)<br>2: (defined depending on message type)<br>3-255: Reserved |

Figure 10:
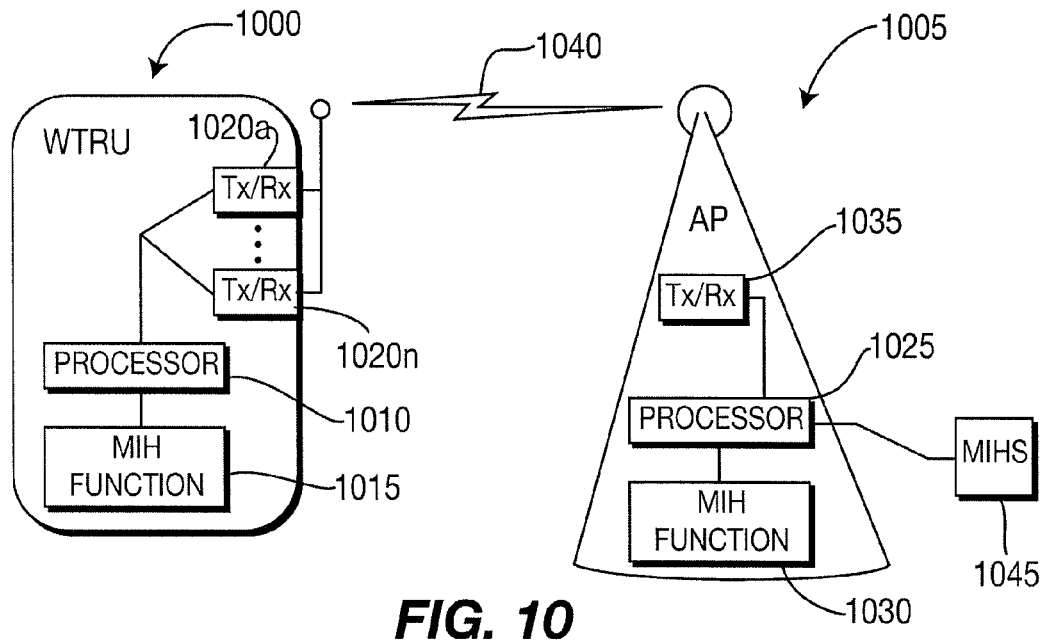
FIG. 10 is a WTRU, Access Point (AP) or Point of Access (PoA) and a Point of Service (PoS) or MIH Server configured to perform heterogeneous handover between a 3GPP and non-3GPP network using MIH messaging.

FIG. 10 is a WTRU 1000 and access point 1005 configured to implement the IEEE 802.21 Inter-RAT Handover as described above. WTRU 1000 includes a processor 1010, an MIH function 1015, and a plurality of transceivers 1020a ... 1020n, each configured to operate using a different radio access technology and protocol. The processor 1010 and MIH function 1015 are configured to operate protocol stacks according to the above described embodiments. Further, the Processor 1010 and MIH function 1015 are capable of generating enhanced messages as described above, for example, with reference to FIG. 8. The processor 1010 and MIH function 1015 are further configured to implement IEEE 802.21 protocols for MIH peer messaging. The IEEE 802.21 messages may be transmitted to MIH peers via any of the plurality of transceivers 1020a ... 1020n. The processor 1010 and MIH function 1015 are further configured to implement local IEEE 802.21, for example for the IEEE 802.21 Command service. The transformation of MIH messages, and the extraction of MIH messages from received messages may be performed by either processor 1010 or MIH function 1015, or by a combination of the two.

Access point 1005 includes a processor 1025, an MIH function 1030, and a transceiver 1035. The access point 1005 communicates with WTRU 1000 via air interface 1040. The processor 1025 of the access point 1005 processes received IEEE 802.21 messages received from WTRU 1000 via transceiver 1035. The processor 1025 and MIH function 1030 of the access point 1005 are further capable of generating enhanced messages as described above, for example, with reference to FIG. 8. The processor 1025 and MIH function 1030 are further configured to implement IEEE 802.21 protocols for MIH peer messaging, such as messaging between the access point 1005 and an MIH server (MIHS) 1045, or a PoS (not shown). The transformation of MIH message, and the extraction of MIH messages from received messages may be performed by either processor 1025 or MIH function 1030, or by a combination of the two.

Figure 11:
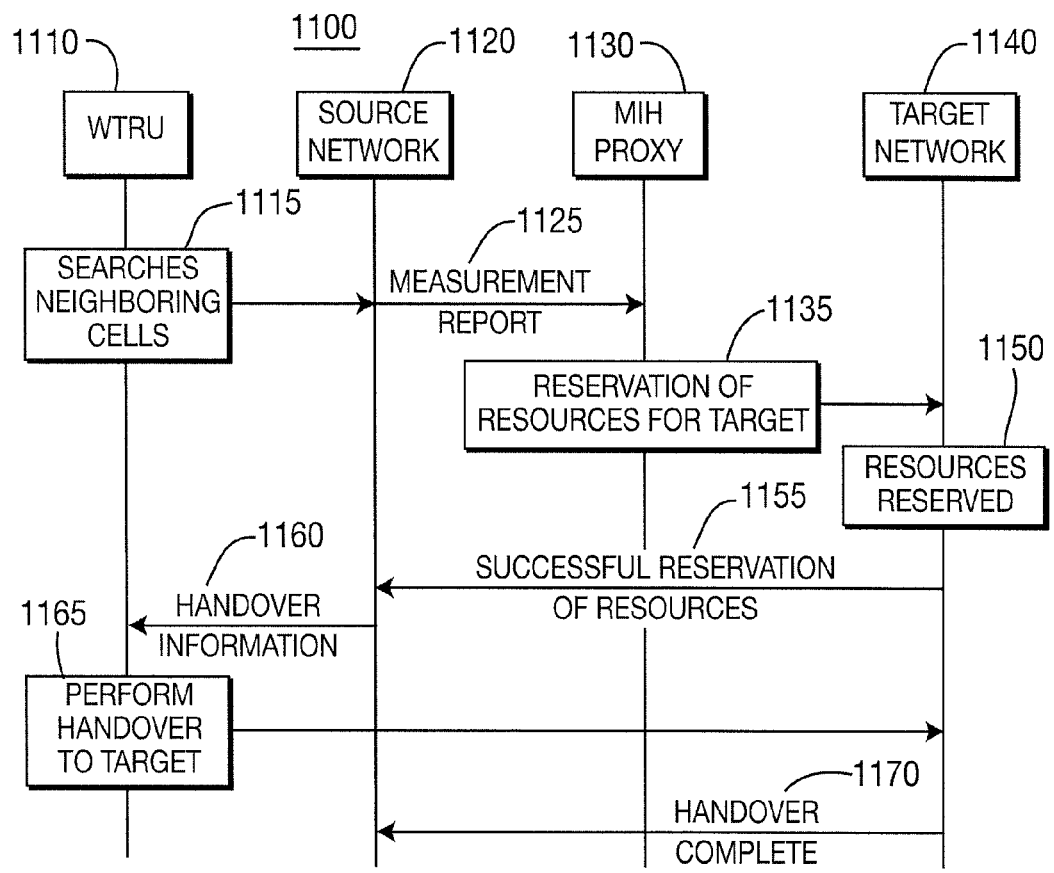
FIG. 11 is a signal diagram of a system performing Inter-RAT Handover using media independent normalizing functions.

FIG. 11 is a signal diagram of a system 1100 performing Inter-RAT Handover using 802.21 media independent normalizing functions. The system includes a WTRU 1110, a source network 1020, an MIH Proxy 1130 and a target network 1140.

Referring to FIG. 11, the WTRU 1110 searches neighboring cells 1115 and provides a measurement report 1125 to the MIH Proxy 1130 via the source network 1120. The MIH Proxy 1130 performs reservation of resources 1135 for the target network 1140. Once the resources are reserved 1150 in the target network 1140, the source network 1120 is informed of the successful reservation of resources 1155 via the MIH Proxy 1130. The handover information 1160 is then sent from the source network 1120 to the WTRU 1110. The WTRU 1110 then performs the handover 1165 to the target network 1140. The target network 1140 then sends a handover complete message 1170 to the source network 1120.

Figure 12:
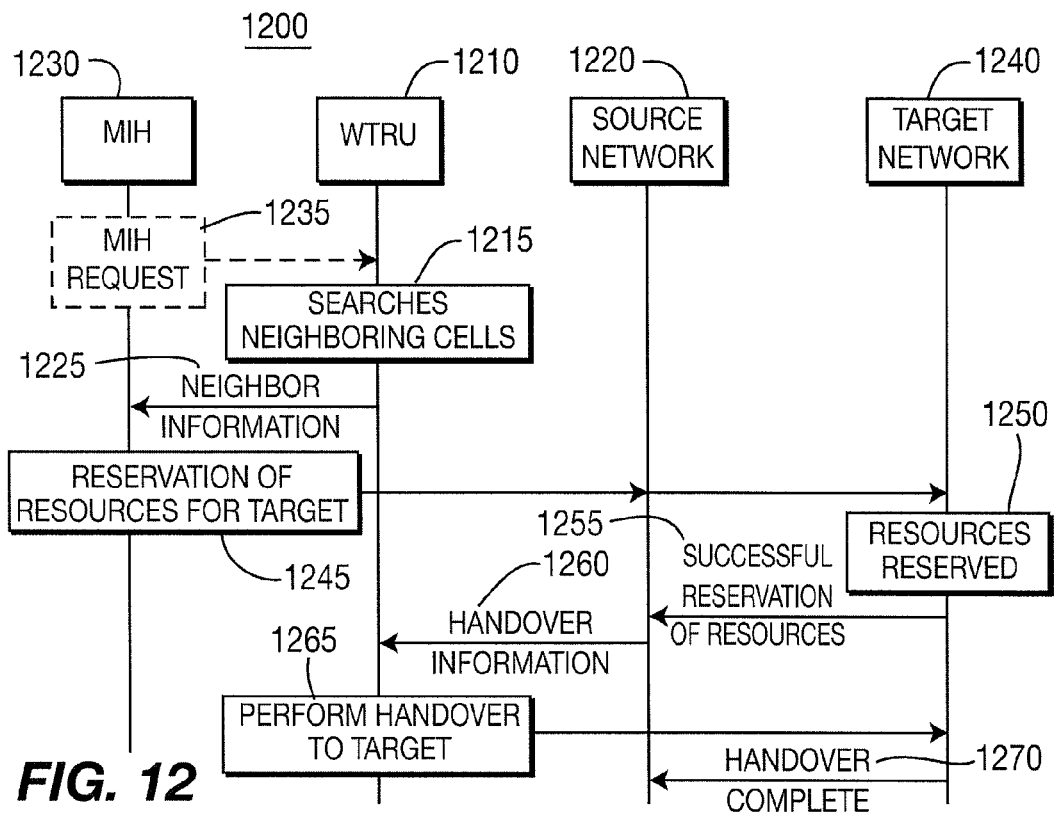
FIG. 12 is a signal diagram of a system performing Inter-RAT Handover using media independent normalizing functions and single-radio with on-off techniques.

FIG. 12 is a signal diagram of a system 1200 performing Inter-RAT Handover using 802.21 media independent normalizing functions and single-radio with on-off techniques. The system includes a WTRU 1210, a source network 1220, an MIH server 1230, and a target network 1240.

Referring to FIG. 12, the WTRU 1210 searches neighboring cells 1215 and provides neighbor information 1225 to the MIH. Optionally, the WTRU 1210 may be triggered by an MIH request 1235 to begin searching neighboring cells 1215. Upon receiving the neighbor information 1225, the MIH server 1230 performs reservation of resources for the target cell 1245 via the source network 1220. Once the resources are reserved 1250 in the target network 1240, the source network 1220 is informed of the successful reservation of resources 1255. The handover information 1260 is then sent from the source network 1220 to the WTRU 1210. The WTRU 1210 then performs the handover 1265 to the target network 1240. The target network 1240 then sends a handover complete message 1270 to the source network 1220.

Figure 13:
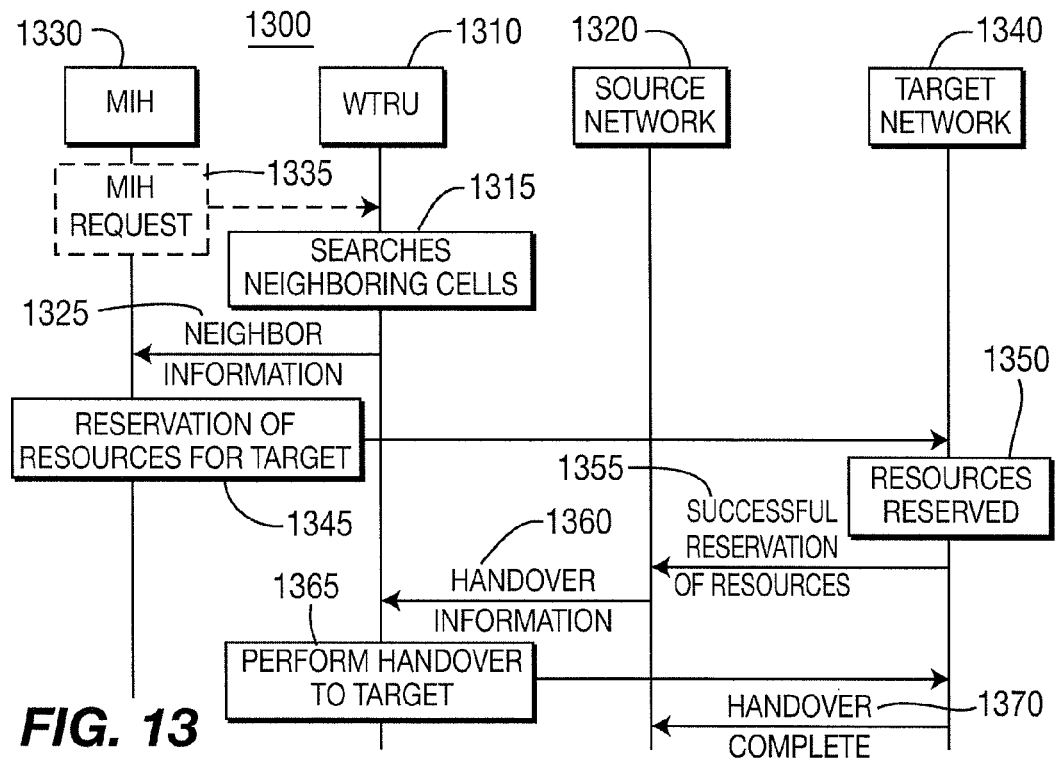
FIG. 13 is a signal diagram of a system performing Inter-RAT Handover using media independent normalizing functions and multi-radio techniques.

FIG. 13 is a signal diagram of a system 1300 performing Inter-RAT Handover using 802.21 media independent normalizing functions and multi-radio techniques. The system includes a WTRU 1310, a source network 1320, an MIH server 1330, and a target network 1340.

Referring to FIG. 13, the WTRU 1310 searches neighboring cells 1315 and provides neighbor information 1325 to the MIH. Optionally, the WTRU 1310 may be triggered by an MIH request 1335 to begin searching neighboring cells 1315. Upon receiving the neighbor information 1325, the MIH server 1330 performs reservation of resources for the target cell 1345. Once the resources are reserved 1350 in the target network 1340, the source network 1320 is informed of the successful reservation of resources 1355. The handover information 1360 is then sent from the source network 1320 to the WTRU 1310. The WTRU 1310 then performs the handover 1365 to the target network 1340. The target network 1340 then sends a handover complete message 1370 to the source network 1320.

Note that the target network 1340 can also send the resource reservation directly to the WTRU 1310 using the target network air interface (not shown), without having to go through the source network 1320. The WTRU 1310 has dual radio so it can receive from the target network 1340 without service interruption from the source network 1320. The source network 1320 should be notified that the handover has been completed, but either the target network 1340 or the WTRU 1310 can release the connection. In this situation, the MIH server 1330 informs the WTRU 1310 to perform the handover based either on dynamic measurements or static policies. The WTRU 1310 then proceeds to reserve and connect directly to the target network 1340 without passing through the MIH server 1330 or the source network 1320.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method implemented in a network node for heterogeneous handover of a wireless transmit/receive unit (WTRU) from a source network to a target network, the method comprising:
   a media independent handover function (MIHF) in conjunction with a processor sending a request message to reserve resources in the target network, wherein the request includes a first transparent container including a radio access technology (RAT) specific configuration for admitting a new connection at the target network and reserving resources; and
   the MIHF and the processor receiving a confirmation message including a second transparent container that indicates a RAT specific configuration of reserved resources at the target network, the second transparent container including information related to a synchronization indication.

2. The method of claim 1, wherein the request message is sent to an enhanced Node B (eNB), a radio network controller (RNC), or a mobile switching center (MSC), a serving general packet radio service (GPRS) support node (SGSN), or a mobility management entity (MME).

3. The method of claim 2, wherein the request message is sent to the SGSN on a Gb interface or an Iu interface.

4. The method of claim 1, wherein the request message is a MIH_N2N_HO_Commit request message.

5. The method of claim 1 wherein the confirmation message is a MIH_N2N_HO_/Commit response message.

6. The method of claim 1, further comprising:
   in response to the confirmation message, the MIHF and the processor sending the WTRU a MIH handover message including a third transparent container that indicates a RAT specific configuration of reserved resources at the target network.

7. The method of claim 1, wherein the request message is a Net_HO_Commit request message.

8. A wireless transmit/receive unit (WTRU), comprising:
   a transceiver configured to:
   receive a media independent handover (MIH) handover message including a transparent container that indicates a radio access technology (RAT) specific configuration of reserved resources at a target network for handover, the transparent container including information related to a synchronization indication; and
   perform a handover to the target network based on the MIH handover message.

9. The WTRU of claim 8 wherein the MIH handover message is a Net_HO_Commit request message.

10. The WTRU of claim 8 wherein the transparent container further includes information related to at least one of: a Normal Cell Indication (NCI); a ARFCN, BSIC-BCCH frequency, and BSIC of a cell; a CCN Support Description; frequency parameters; extended dynamic allocation; a Network Control Order; an RLC reset; a packet timing advance; an UL control timeslot; GPRS or EGPRS mode; UL/DL TBF information; a NAS container.

11. The WTRU of claim 8 wherein the transparent container includes information related to at least one of: WTRU identity; a ciphering algorithm; RB information; UL/DL transport channel information; UL radio resources; DL radio resources; frequency; and maximum allowed UL transmit power.

12. A method implemented in a wireless transmit/receive unit (WTRU), the method comprising:
   receiving a media independent handover (MIH) handover message including a transparent container that indicates a radio access technology (RAT) specific configuration of reserved resources at a target network for handover, the transparent container including information related to a synchronization indication; and
   performing a handover to the target network based on the MIH handover message.

13. The method of claim 12 wherein the MIH handover message is a Net_HO_Commit request message.

14. The method of claim 12 wherein the transparent container further includes information related to at least one of: a Normal Cell Indication (NCI); a ARFCN, BSIC-BCCH frequency, and BSIC of a cell; a CCN Support Description; frequency parameters; extended dynamic allocation; a Network Control Order; an RLC reset; a packet timing advance; an UL control timeslot; GPRS or EGPRS mode; UL/DL TBF information; a NAS container.

15. The method of claim 12 wherein the transparent container includes information related to at least one of: WTRU identity; a ciphering algorithm; RB information; UL/DL transport channel information; UL radio resources; DL radio resources; frequency; and maximum allowed UL transmit power.

* * * * *